Figure 9:
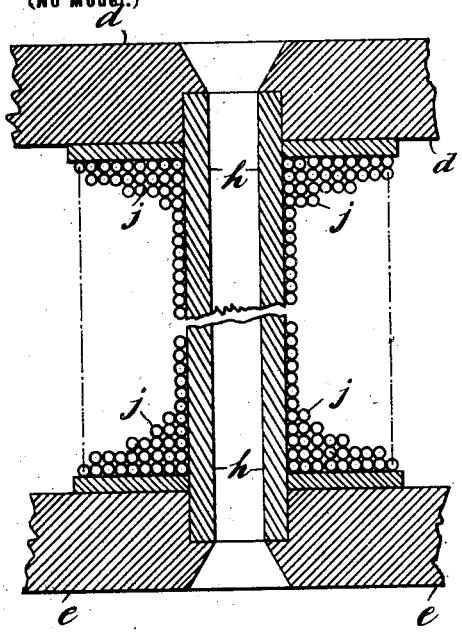

No. 703,970. Patented July 1, 1902.
J. R. QUAIN.
ELECTRICAL HEATING APPARATUS.
(Application filed Mar. 10, 1902.)
(No Model.) 2 Sheets—Sheet 1.
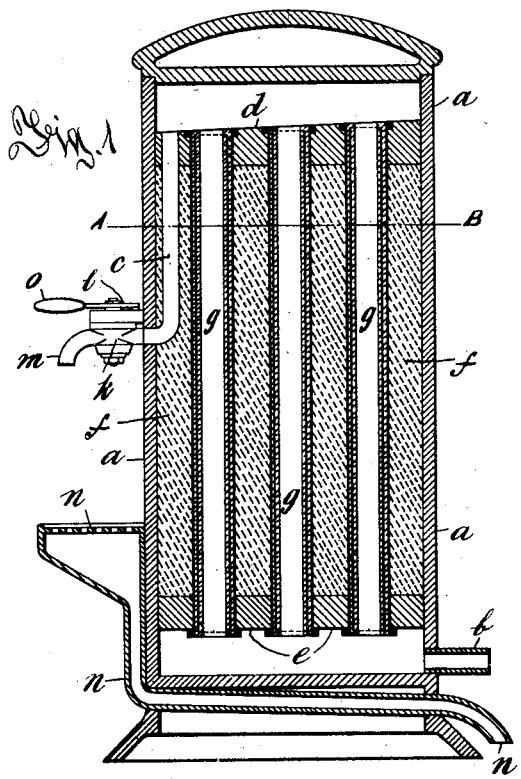
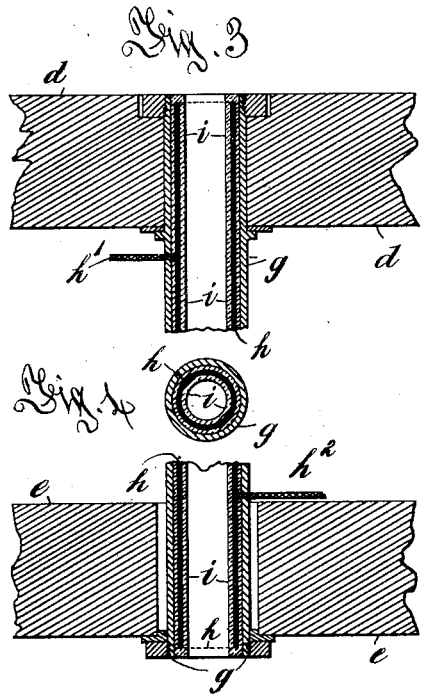
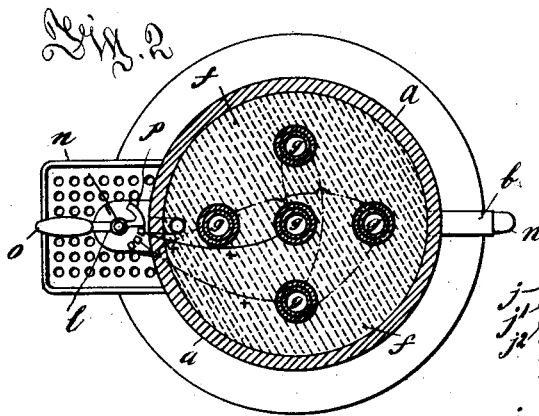
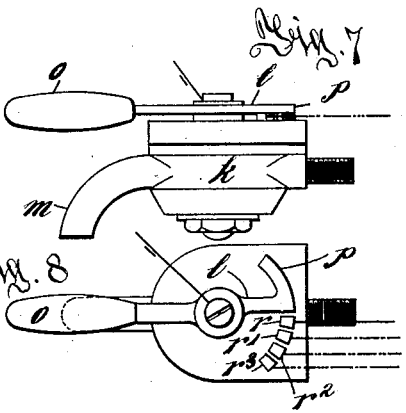
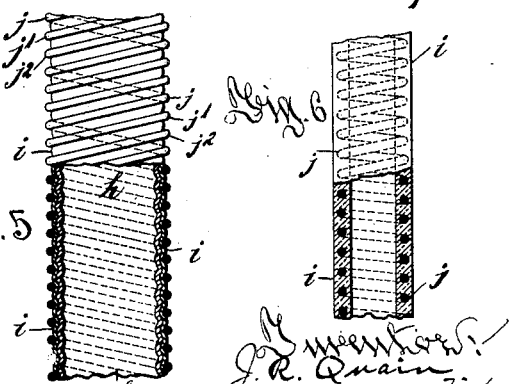

No. 703,970. Patented July 1, 1902.
J. R. QUAIN.
ELECTRICAL HEATING APPARATUS.
(Application filed Mar. 10, 1902.)

(No Model.) 2 Sheets—Sheet 2.

UNITED STATES PATENT OFFICE.

JOHN ROBERT QUAIN, OF MIDDLESEX COUNTY, ENGLAND.

ELECTRICAL HEATING APPARATUS.

SPECIFICATION forming part of Letters Patent No. 703,970, dated July 1, 1902.

Application filed March 10, 1902. Serial No. 97,619. (No model.)

*To all whom it may concern:*

Be it known that I, JOHN ROBERT QUAIN, a subject of the King of Great Britain, residing at the Royal Colonial Institute, Northumberland avenue, in the county of Middlesex, England, have invented certain new and useful Improvements in Electrical Heating Apparatus, of which the following is a specification.

My invention relates to improvements in apparatus for applying electricity to heating water or other liquids in which the water is made to pass near or against surfaces rendered hot by the passage of a current of electricity through them; and the objects of my improvements are, first, to provide a simple device by which water is heated by a current of electricity; second, to combine a cock for the water-supply with a switch for the electrical current, so that when the supply of water is shut off the current of electricity is simultaneously shut off, and vice versa; third, to regulate the amount of electricity used and of heat generated thereby. I attain these objects by the devices illustrated in the accompanying drawings, in which—

Figure 1 is a vertical section through a heater for electrically heating water or other liquid. Fig. 2 is a horizontal section through A B, Fig. 1. Fig. 3 is a vertical section, and Fig. 4 a horizontal section, upon a larger scale, through one of the heating-tubes. Fig. 5 is a broken side view, partly in section, through a modified form of one of the heating-tubes. Fig. 6 is a broken side view, partly in section, through a further modified form of a heating-tube. Fig. 7 is a side view of a cock for drawing off the water from the heater and of the switch for the electric current. Fig. 8 is a plan of Fig. 7. Fig. 9 is a vertical section through a heating-tube heated by the passage of low-tension electrical current through an insulated coil around it.

Similar letters refer to similar parts throughout the several views.

In Figs. 1 and 2, $a$ is a suitable vessel connected with an inlet or supply pipe $b$ for the water or other fluid and also with a suitable outlet or discharge pipe $c$. In this vessel I arrange perforated plates or diaphragms $d$ $e$, which are fixed at suitable distances apart, and between these plates or diaphragms is arranged a similarly-perforated block $f$, of cement or other like suitable material. The upper diaphragm $d$ is inclined toward the discharge-outlet, as shown in Fig. 1. These parts are so arranged that the water or other fluid to be heated must in passing from the inlet $b$ to the outlet $c$ of the said vessel flow through the said perforations. In the holes in the said block $f$, of cement or other material, or between the said perforated plates or diaphragms I arrange electrical heating-conductors of spiral, helical, or other form in such a manner that the water or other fluid will flow in contact with the said conductors or in contact with surfaces heated thereby.

In Figs. 1 and 2, $g$ $g$ represent tubes firmly fixed into the upper and lower plates or diaphragms $d$ and $e$ by nuts and washers, and in Figs. 3 and 4 one of these tubes $g$ is shown upon a larger scale. $h$ is a tube of very thin resisting metal or alloy covered with enamel $i$ inside and out, the tubes $h$ being connected with the supply of electricity of low tension by insulated conductors $h'$ and $h^2$, so that they will become heated by the current while the water or other liquid to be heated is passing through them. The current of electricity may be made to pass through one, two, three, or more of the tubes, as may be desired.

Fig. 5 shows a slightly-modified form of electrical conducting-tube. In this case the inner metal supporting-tube $h$ is corrugated from end to end externally with helical grooves, forming helices of one, two, or more threads, three parallel threads being shown in the figure. A corresponding number of helical conductors $j$ $j'$ $j^2$ lie in the helical grooves, with the intervention of enamel or other non-conducting material $i$. The conductors are separately connected near their upper and lower ends with leads from the supply of electricity and the tube becomes very highly heated and heats the water or other liquid passing through it. By means of switches of the ordinary kind the current may be passed through one or more of the helical conductors, as may be desired.

Fig. 6 shows another slightly-modified form of the heating-tube. $j$ is the helical conductor, embedded in and surrounded by enamel or other non-conducting material $i$, the tube thus formed being either self-contained or being carried in a separate tube resembling g, Figs. 3 and 4.

I arrange the tap or cock k, Figs. 1 and 2 and 7 and 8, for controlling the discharge of the water from the heating vessel a in combination with a switch l, so that the electrical heating-current is itself turned on or off or regulated as required simply by the operation of opening or closing the said tap or cock.

The cock k, which discharges the water from the vessel a through a spout m, below which is arranged a drain and waste pipe n, is worked by a handle o, upon which is also fixed an insulated switch p, which as the handle is turned passes over a series of contacts $r\ r'\ r^2\ r^3$, by which the passage of the heating-current of electricity through the several helical or other conductors is regulated. Thus in one position of the handle o none of the electrical circuits will be completed and the water will not be heated, but can still run through the apparatus, being discharged cold. By then turning the handle partly around the current will be passed through a small number of the conductors in the heating-tubes. By turning it farther through a larger number of them and eventually through all of them while in one position both the cock will be closed and all the heating-conductors cut out of circuit.

If electrical current of very low electromotive force or tension is used, uninsulated conductors or electrodes may be used, and the water or other fluid may flow in direct contact with these conductors or electrodes.

Fig. 9 shows a still further variation in the construction of the heating-tubes. d e are the transverse diaphragms between which the tube h, through which the water to be heated passes, is arranged and fixed. This tube is itself made of hard iron or steel of considerable thickness, and the electrical insulated conductor j is wound or coiled around it, the passage of the electrical current heating the tube, which forms the core of the coil, and thus heating the liquid which passes through it.

I am aware that prior to my invention electrical heating apparatus has been made, in which the heat has been obtained by a current of electricity passing through conductors or electrodes, and I do not claim such a construction broadly, but

What I claim as my invention, and desire to secure by Letters Patent, is—

1. In an electrical heating apparatus, the combination of a vessel provided with an inlet and an outlet, substantially parallel diaphragms mounted in said vessel, a block, provided with vertical perforations, between said diaphragms, heating-tubes passing through the perforations in said block, and means for heating said tubes by a current of electricity, substantially as described.

2. In an electrical heating apparatus, the combination of a vessel provided with an inlet and outlet, substantially parallel diaphragms mounted in said vessel, a vertically-perforated block of non-conducting material between said diaphragms, heating-tubes passing through the perforations in said block, said tubes being composed of material which offers considerable resistance to the passage of electricity therethrough, and electric connections leading to said tubes respectively, substantially as described.

3. In an electrical heating apparatus, the combination of a vessel provided with an inlet and outlet, substantially parallel diaphragms mounted in said vessel, the upper surface of the upper diaphragm being inclined, a vertically-perforated block of non-conducting material between said diaphragms, metallic tubes passing through the perforations in said block, and electrical connections leading to said metallic tubes, said block and upper diaphragm being provided with a passage communicating with the outlet of the vessel, substantially as described.

In witness whereof I have hereunto set my hand in the presence of two witnesses.

JOHN ROBERT QUAIN.

Witnesses:
ALFRED G. BRATTON,
ERNEST F. FOTHERGILL.